US011943580B2

(12) United States Patent
Hansen et al.

(10) Patent No.: US 11,943,580 B2
(45) Date of Patent: Mar. 26, 2024

(54) SYSTEM FOR REDUCING VIBRATIONS IN LOUDSPEAKER

(71) Applicant: EPOS Group A/S, Ballerup (DK)

(72) Inventors: Anders Røser Hansen, Ballerup (DK); Jacob Stage, Ballerup (DK)

(73) Assignee: EPOS Group A/S, Ballerup (DK)

( * ) Notice: Subject to any disclaimer, the term of this patent is extended or adjusted under 35 U.S.C. 154(b) by 0 days.

(21) Appl. No.: 18/299,823

(22) Filed: Apr. 13, 2023

(65) Prior Publication Data

US 2023/0254636 A1 Aug. 10, 2023

Related U.S. Application Data

(63) Continuation of application No. 17/878,470, filed on Aug. 1, 2022, now Pat. No. 11,659,319, which is a (Continued)

(30) Foreign Application Priority Data

Jan. 20, 2020 (EP) .................................... 20152596

(51) Int. Cl.
*H04R 1/28* (2006.01)
*H04R 1/02* (2006.01)
*H04R 1/08* (2006.01)

(52) U.S. Cl.
CPC ........... *H04R 1/2896* (2013.01); *H04R 1/025* (2013.01); *H04R 1/08* (2013.01); *H04R 1/288* (2013.01);

(Continued)

(58) Field of Classification Search
CPC ........ H04R 1/2896; H04R 1/025; H04R 1/08; H04R 1/288; H04R 2420/07; H04R 2499/11

(Continued)

(56) References Cited

U.S. PATENT DOCUMENTS 5,681,023 A 10/1997 Sheydayi
2013/0271902 A1 10/2013 Lai et al.

(Continued)

FOREIGN PATENT DOCUMENTS

EP 0 978 978 A2 2/2000
EP 0 978 978 A3 2/2000

(Continued)

*Primary Examiner* — Sean H Nguyen

(74) *Attorney, Agent, or Firm* — Birch, Stewart, Kolasch & Birch, LLP

(57) ABSTRACT

A speaker device is disclosed. The speaker device includes a speaker enclosure structure including a speaker. The speaker is an electro-mechanical component, which in operation generates sound waves by deflection of a speaker membrane and in collaboration with the speaker enclosure structure. The speaker device further includes a speaker device housing. The speaker device housing is an outer shell of the speaker device and may accommodate additional electronic components required for operation of the speaker or for other purposes. The speaker enclosure structure is mechanically coupled to the speaker device housing. The speaker device further includes at least one coupling element, wherein the speaker enclosure structure is mechanically coupled to the speaker device housing by the at least one coupling element, the coupling element having a vibration damping structure configured to inhibit mechanical vibrations being transmitted through the coupling element.

17 Claims, 7 Drawing Sheets

Related U.S. Application Data continuation of application No. 17/153,469, filed on Jan. 20, 2021, now Pat. No. 11,451,903.

(52) U.S. Cl.
CPC ...... *H04R 2420/07* (2013.01); *H04R 2499/11* (2013.01)

(58) Field of Classification Search
USPC .......................................................... 381/354
See application file for complete search history.

(56) References Cited

U.S. PATENT DOCUMENTS

| | | | |
|---|---|---|---|
| 2015/0256922 | A1 | 9/2015 | Shi |
| 2018/0139523 | A1 | 5/2018 | Takahashi et al. |
| 2019/0364357 | A1 | 11/2019 | Haastrup et al. |

FOREIGN PATENT DOCUMENTS

| | | | |
|---|---|---|---|
| EP | 1 370 109 | A2 | 12/2003 |
| EP | 1 370 109 | A3 | 12/2003 |
| JP | 2008-193502 | A | 8/2008 |

SYSTEM FOR REDUCING VIBRATIONS IN LOUDSPEAKER

This application is a Continuation of copending application Ser. No. 17/878,470, filed on Aug. 1, 2022, which is a Continuation of application Ser. No. 17/153,469, filed on Jan. 20, 2021 (now U.S. Pat. No. 11,451,903 issued Sep. 20, 2022), which claims priority under 35 U.S.C. § 119(a) to Application No. 20152596.1, filed in Europe on Jan. 20, 2020, all of which are hereby expressly incorporated by reference into the present application.

FIELD

The present disclosure relates to a speaker device including a speaker, e.g. a loudspeaker or speakerphone.

BACKGROUND

Any speaker device including a loudspeaker will be subject to vibration caused by the speaker. In Bluetooth speakers, speakerphones etc. mechanical vibration resulting from the use of a loudspeaker causes a plurality of problems. The dominant signal path from loudspeaker to microphone (s) is typically the purely acoustical path. The mechanical vibrations are another. The mechanical vibrations transferred to the microphone are often significant in certain point in the frequency range played back (sharp peaks) but also broad band transfer of vibrations can be significant. In addition, the vibrations can cause rattling of other elements attached to the speakerphone (e.g. buttons, plugs, wires etc.), which in turn can create unwanted acoustical contributions to both sounds emitted from the device but also sound transmitted to the microphone(s). Furthermore, the various pathways for vibrations to enter the microphones can be nonlinear (resulting in low coherence between signal to speaker and signal received by microphone) which makes them difficult to handle in e.g. a linear echo canceller.

Therefore, there is a need to provide a solution that addresses at least some of the above-mentioned problems.

SUMMARY

According to an aspect, a speaker device includes a speaker enclosure structure including a speaker. The speaker is an electro-mechanical component which in operation generates sound waves by deflection of a speaker membrane and in collaboration with the speaker enclosure structure. The speaker device further includes a speaker device housing. The speaker device housing is an outer shell of the speaker device and may accommodate additional electronic components required for operation of the speaker or for other purposes. The speaker enclosure structure is mechanically coupled to the speaker device housing. In some embodiment, the speaker enclosure structure may be mechanically coupled to the speaker device housing by at least one coupling element. The coupling element may have a vibration damping structure configured to inhibit mechanical vibrations being transmitted through the coupling element.

This allows that the transmission of mechanical vibrations from the speaker enclosure structure to the speaker device housing is inhibited. Thereby, rattling and negative influences on electronic devices accommodated in the speaker device housing induced by the speaker and transmitted through the coupling element can be reduced.

According to an aspect, at least one first damping element provided at the speaker device housing may support the speaker device housing. The first damping element may be flexible and configured to dampen mechanical vibrations.

This allows that vibrations applied on the speaker device housing are dampened or cancelled. Thereby, rattling and negative influences on electronic devices accommodated in the speaker device housing can be reduced.

According to an aspect, the speaker device further includes a support assigned to the speaker enclosure structure and capable of individually and at least partly supporting the speaker enclosure structure extraneously to the speaker device housing. The support supports the weight of the speaker enclosure structure on an external structure.

This allows that the speaker enclosure is supported at an external structure without contribution or interposition of the speaker device housing. The supports can be used, since the needed amplitude that the suspension and mechanical configuration must be able to deal with can be reduced.

According an aspect, the support assigned to the speaker enclosure structure may be formed by at least one second damping element provided at the speaker enclosure structure. The second damping element being flexible and configured to dampen mechanical vibrations.

This allows that vibrations generated by the speaker and applied on the speaker enclosure structure are dampened or cancelled. Thereby, rattling and negative influences on electronic devices accommodated in the speaker enclosure structure can be reduced further. This allows that the transmission of mechanical vibrations from the speaker enclosure structure to the speaker device enclosure or from the speaker device housing to the speaker enclosure structure is inhibited more effectively.

According to an aspect, the speaker device housing is formed of two parts, the first part of the speaker device housing accommodating the speaker enclosure mechanically coupled to the first part by the at least one coupling element. In one aspect, at least one first damping element provided at the second part of the speaker device housing. In one aspect, at least one second damping element provided at the first part of the speaker device housing.

According to an aspect, the coupling element may be formed integrally with at least one of the speaker enclosure structure or the speaker device housing.

This allows a reduction of manufacturing costs and a reduction of the number of components to be assembled for manufacture of the speaker device.

According to an aspect, the speaker enclosure structure may be mechanically coupled to the speaker device housing by a plurality of the coupling elements. The coupling elements may be arranged at different sides with respect to the speaker enclosure structure.

According an aspect, the coupling element may be formed as an enclosing suspension around the speaker enclosure structure.

According to an aspect, the coupling element may be formed of soft foam.

This allows that the transmission of mechanical vibrations from the speaker enclosure structure to the speaker device enclosure or from the speaker device housing to the speaker enclosure structure is inhibited more effectively.

According to an aspect, the speaker device housing may surround the speaker enclosure structure.

According to yet another aspect, wherein the speaker device further includes at least one of at least one microphone, at least one battery and further electronic components mounted to the speaker device housing and separated from the speaker enclosure structure.

This allows that the speaker device can receive and process acoustic signals.

According to an aspect, wherein an enclosing suspension is formed around at least one of the at least one microphone, the at least one battery and further electronic components (10, 11) configured to dampen mechanical vibrations.

According to yet another aspect, the speaker device may be a speakerphone.

According to yet another aspect, the speaker device may be a Bluetooth speaker, e.g. a speaker device having a Bluetooth transceiver.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
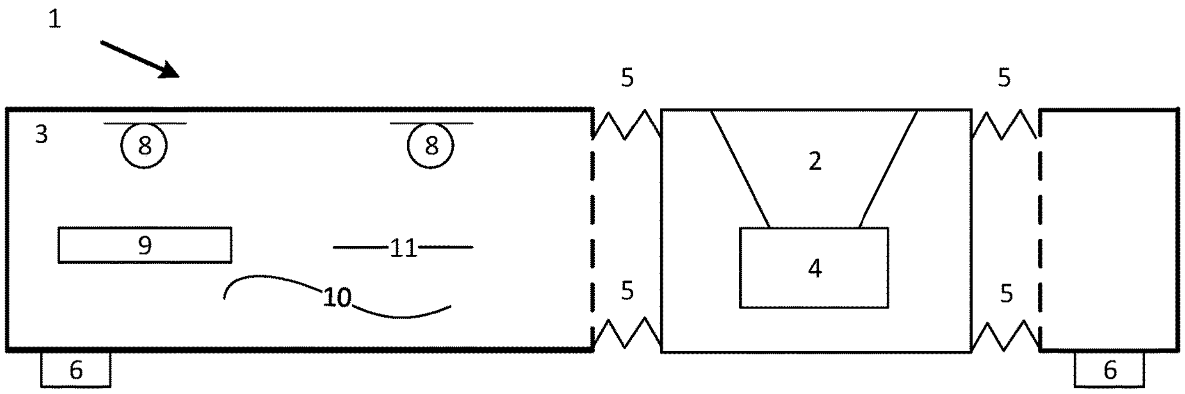
FIGS. 1A-F is a cross-sectional side view of a speaker device according to an embodiment of the disclosure.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending on particular application, design constraints or other reasons, these elements may be implemented using electronic hardware, computer program, or any combination thereof.

The speaker device or loudspeaker can be of any kind, e.g. a dynamic loudspeaker (using a permanent magnet and a (voice) coil connected to a diaphragm or cone; the coil (and hence the diaphragm) is axially moving in the field from the permanent magnet when an electric current of varying polarity (AC) is applied to the coil). Other loudspeaker types, e.g. based on piezoelectric or electrostatic principles, etc., can be used. The speaker device may be a speakerphone with or without video and/or collaboration bars. In an aspect the speaker device may be a video conference device. In an aspect the speaker device may be a Bluetooth speaker.

The chamber surrounding the loudspeaker unit can be open or closed. Various types of acoustic couplings (drivers and acoustic resonators and transmission paths) of the loudspeaker unit and a surrounding chamber can be used, e.g. band pass, bass reflex, horn, etc.

FIGS. 1A-F illustrates a speaker device 1 according to different aspects of the disclosure in a cross-sectional side view of the speaker device 1. The speaker device 1 has a speaker enclosure structure 2, the speaker enclosure structure 2 being a substantially hollow structure enclosing an internal space. The speaker enclosure structure 2 may have a cuboid shape, cylindrical shape, spherical shape or the like but not limited to those. The speaker enclosure structure 2 may have different topologies, such as closed box, vented or isobaric but not limited to these.

A speaker 4, which is an electronic component capable of emitting sound, is provided at the speaker enclosure 2. The speaker 4 may be a piezoelectric speaker, a speaker having a voice coil, a digital speaker or any other commonly known type speaker. The speaker 4 may be attached to a wall of the speaker enclosure structure 2 or may be arranged within the internal space of the speaker enclosure structure 2 and connected to the speaker enclosure structure 2. The speaker 4 may be connected to the speaker enclosure structure 2 by means of additional mounting devices, if required.

The speaker 4 and the speaker enclosure 2 are arranged such that sound waves can be generated by collaboration of the speaker 4 and the speaker enclosure 2. Although not shown, additional electronic components required for operation of the speaker 4 or used for other functions of the speaker device 1 may be provided in or at the speaker enclosure structure 4.

Further, the speaker device 1 has a speaker device housing 3. The speaker device housing 3 is a general-type housing as commonly used for electronic devices. The speaker device housing 3 may be formed of plastic, metal or the like. The speaker device housing 3 is, for example, a housing formed by injection moulding. However, the speaker device housing 3 may also be a housing formed by other forming methods, such as milling.

Figure 1B:
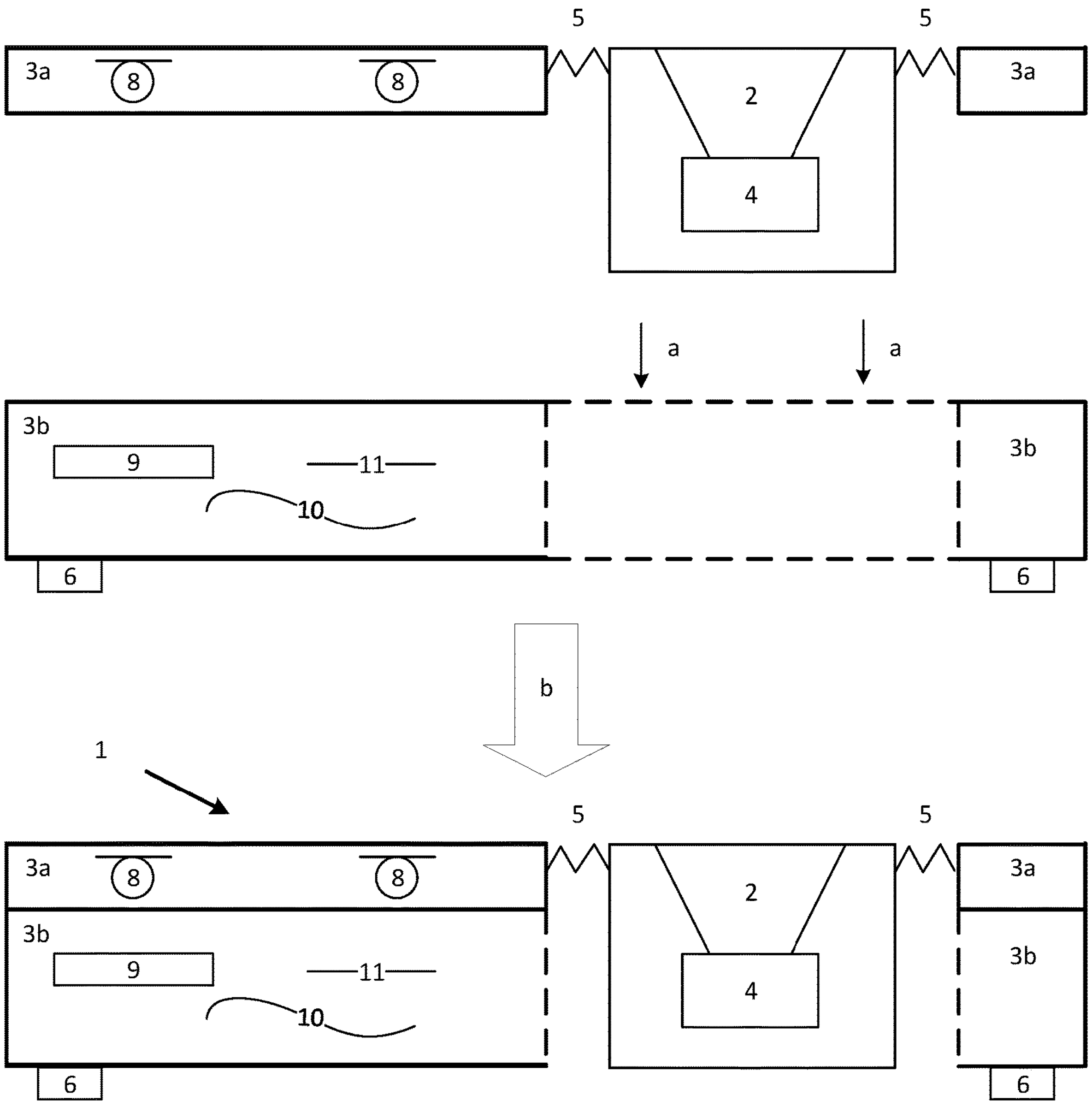
Figure 1C:
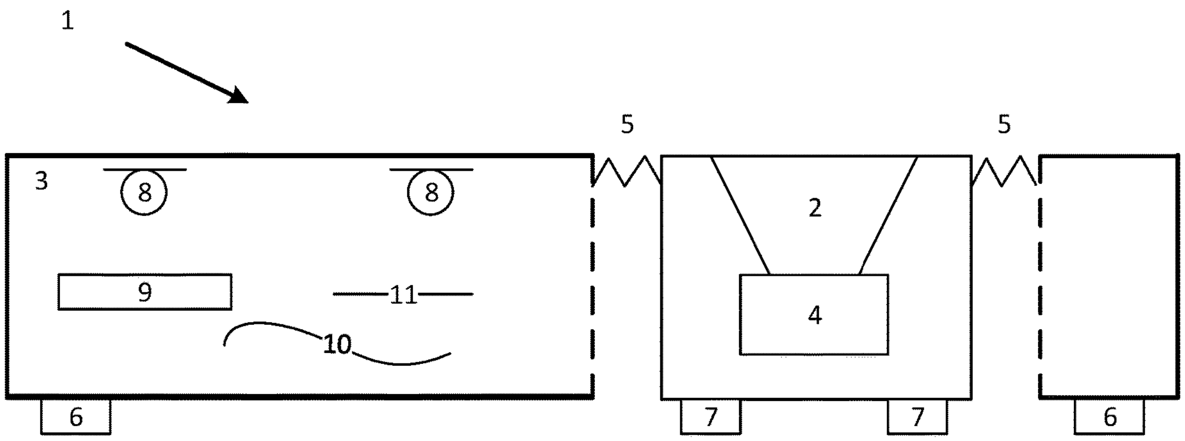
Figure 1D:
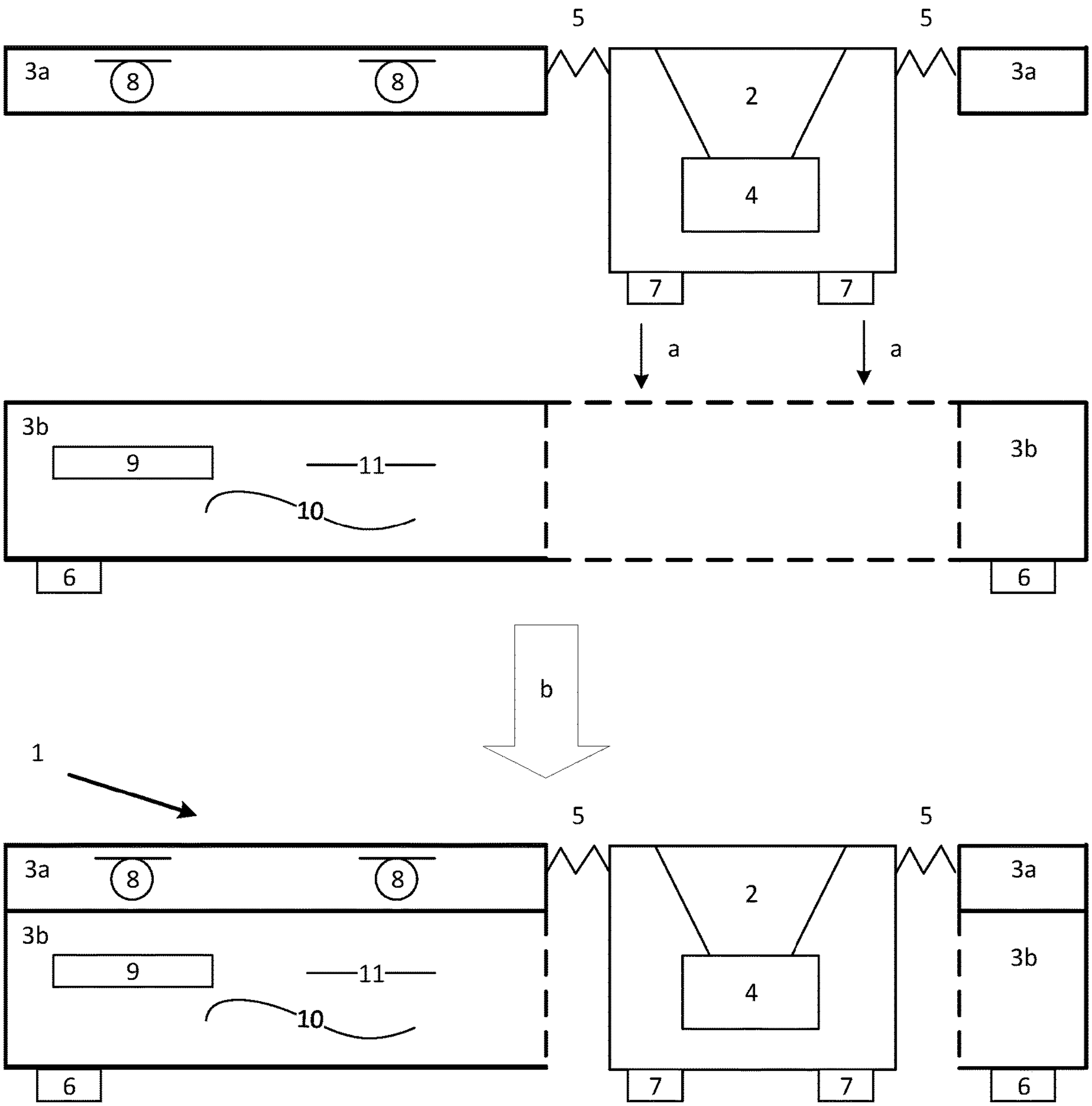

In FIGS. 1A, C, E, the speaker device housing 3 is shown to be formed as a single part and in FIGS. 1B, D, F, the speaker device housing 3 is shown to be formed by two parts, a first part 3*a* and a second part 3*b*, where the first part 3*a* is arranged on top of the second part 3*b*. The speaker device housing 3 accommodates microphones 8 and additional electrical components of the speaker device 1, such as battery 9, cables 10, and PCB boards 11. These additional components may be used for operation of the speaker 4. They may also be used for other functions of the speaker device 1, such as operation of the microphones 8, establishing a remote connection to an external device or the like. The speaker device housing 3 may also accommodate components other than the components explicitly enumerated above. In some aspect, the first part 3*a* of the speaker device housing 3 may accommodates the microphones 8. Furthermore, the second part 3*b* of the speaker device housing 3 may accommodates the additional electrical components of the speaker device 1, such as battery 9, cables 10 and PCB boards 11.

As shown in FIGS. 1A-F, the speaker device 1 has a support 6, provided at the speaker device housing 3 and adapted to support the speaker device housing 3 on an extraneous structure. The support 6 may be formed integrally with the speaker device housing 3 or may be a separate member attached to the speaker device housing 3. The support 6 may be formed by at least one damping element (first damping element) 6, which is flexible or at least substantially elastic and configured to dampen mechanical vibrations. That is, vibrations being applied to the speaker device housing 3 are dampened or cancelled by the damping element 6.

For example, the first damping element 6 is formed of rubber, metal or a rubber-metal compound. For example, the first damping element 6 is a rubber foot, a rubber pad, a rubber buffer or the like, attached to the speaker device housing 3. Further, the damping elements may have high viscosity to enhance the absorption of energy.

Although FIG. 1 shows two first damping elements 6 supporting the speaker device housing 3, the speaker device housing 3 may be supported by one single first damping element 6 or by a different number of first damping elements 6. Although the first damping element 6 is shown in FIGS. 1A-F having a cubic shape, the first damping element 6 may be formed in an annular shape, a rib-shape, a plate-shape or the like.

As shown in FIGS. 1C-F, the speaker enclosure structure 2 has a support 7 assigned to it, which is capable of individually and at least partly supporting the speaker enclosure structure 2 extraneously. In other words, the support 7 is adapted to support at least part of the weight of the speaker enclosure structure 2 on an extraneous structure independently of the speaker device housing 3.

Although not shown in FIGS. 1A-F, the speaker enclosure structure 2 may be supported from below the speaker enclosure structure 2 by means of the support 7 being placed on a flat surface without interposition or contribution of the speaker device housing 3. However, the support 7 may also support the speaker enclosure structure 2 by being attached to a wall or a room ceiling or the like.

Figure 1E:
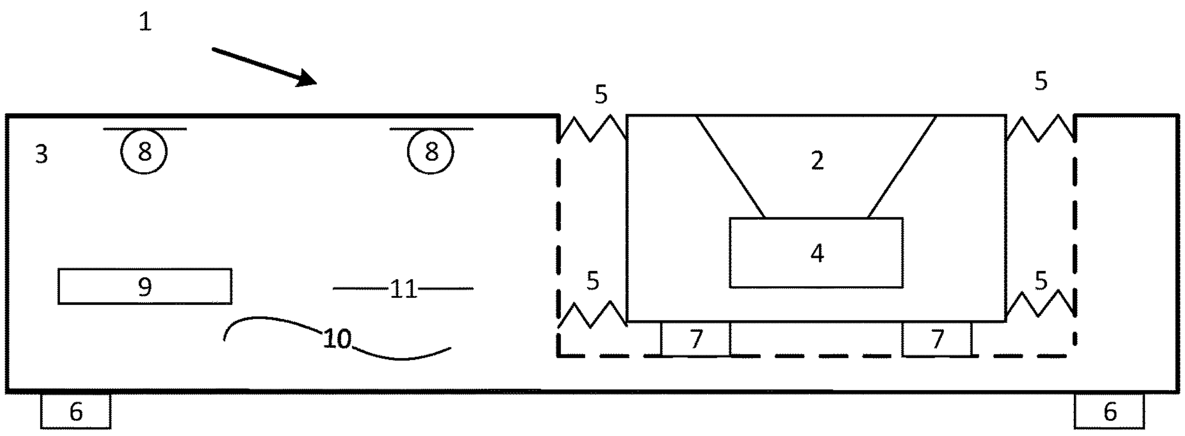
Figure 1F:
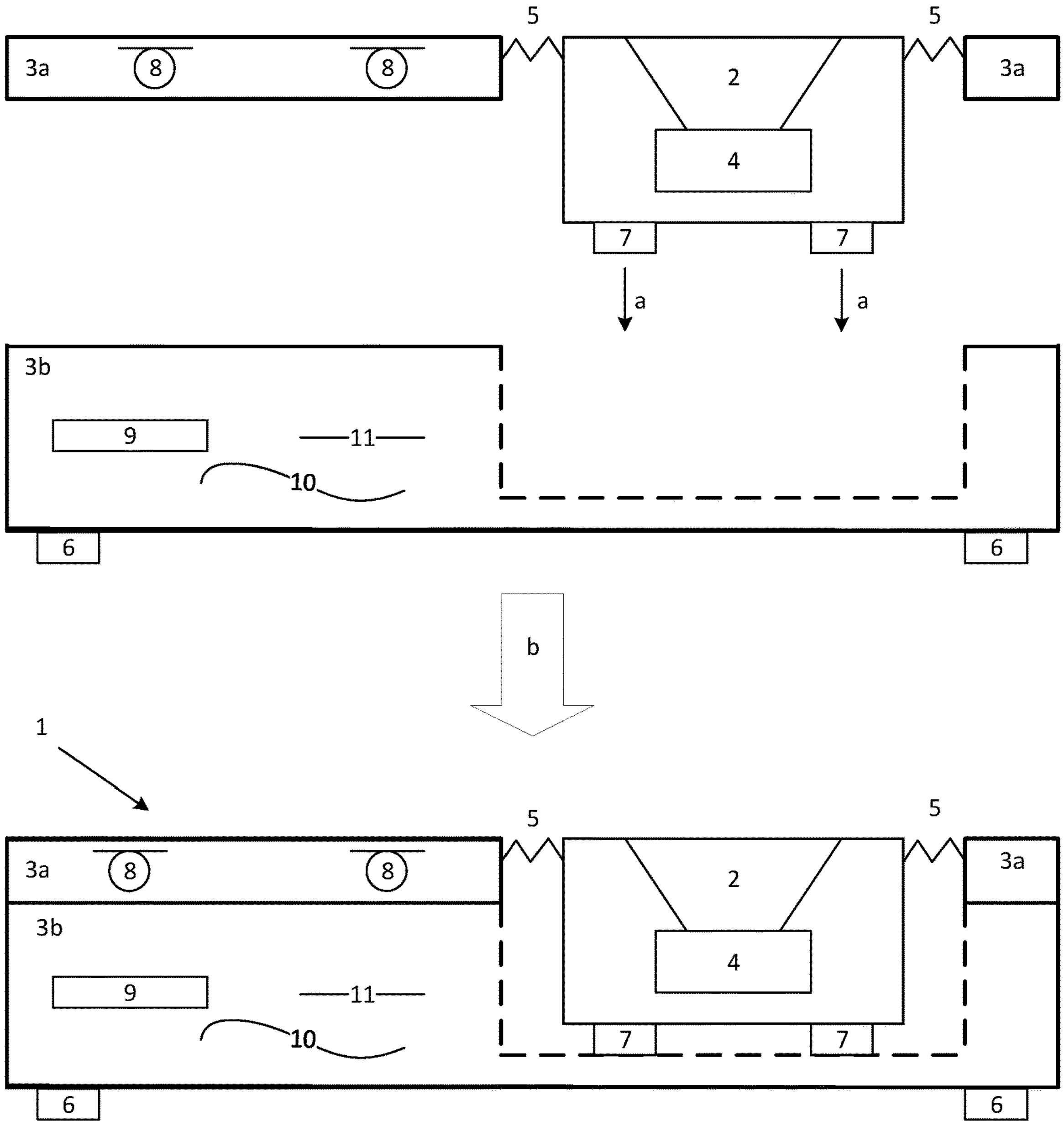

As shown in FIGS. 1E-F, the speaker enclosure structure 2 may be supported from below the speaker enclosure structure 2 by means of the support 7 being placed on an internal surface of the speaker device housing 3.

Although the speaker device housing is shown in FIGS. 1A-F to be configured as described above, the speaker device housing may have a different configuration. The additional electric components may be accommodated in the other part of the housing, respectively or all of them may be accommodated in the first part 3*a* of the speaker device housing 3 or all of them may be accommodated in the second part 3*b* of the speaker device housing 3. In other words, the additional electrical components of the speaker device 1 are accommodated in the speaker device housing 3 according to the requirements regarding installation space, regarding the electrical connections between the components or the like.

Although the speaker device housing 3 is shown in FIGS. 1A-F to be formed by a single part 3 or by two parts 3*a*, 3*b* arranged on top of each other, other arrangements of the speaker enclosure structure 2 and the speaker device housing 3 are possible. For example, the speaker device housing 3 may be formed by only one part arranged at a side of the speaker enclosure structure 2.

Further, the speaker device housing 3 may be formed of more than two parts. Further, the speaker device housing 3 may be configured to at least partly surround the speaker enclosure structure 2. Furthermore, the speaker device 1 may include more than one speaker enclosure structure 2.

Furthermore, the support 7 supporting the speaker enclosure structure 2 may be formed integrally with the speaker enclosure structure 2 or may be a separate member attached to the speaker enclosure structure 2. The support 7 may be formed by at least one damping element (second damping element) 7, which is flexible or at least substantially elastic and configured to dampen mechanical vibrations. That is, vibrations being applied to the speaker enclosure structure 2 are dampened or cancelled by the second damping element 7. In particular, mechanical vibrations generated by the operation of the speaker 4 and applied to the speaker enclosure structure 2 are dampened or cancelled by the second damping element 7.

For example, the second damping element 7 is formed of rubber, metal or a rubber-metal compound. For example, the second damping element 7 is a rubber foot, a rubber pad, a rubber buffer or the like, attached to the speaker enclosure structure 2. Further, the damping elements may have high viscosity to enhance the absorption of energy.

Although FIGS. 1C-F shows two second damping elements 7 supporting the speaker enclosure structure 2, the speaker enclosure structure 2 may be supported by one single second damping element 7 or by a different number of second damping elements 7. Although the second damping element 7 is shown in FIGS. 1C-F to have a cubic shape, the second damping element 7 may be formed in an annular shape, a rib-shape, a plate-shape or the like.

As shown in FIGS. 1A-F, the speaker enclosure structure 2 and the speaker device housing 3 are mechanically coupled. Thereby, at least part of the weight of the speaker enclosure structure 2 or the speaker device housing 3 is supported via the mechanical coupling 5. However, since the speaker enclosure structure 2 and the speaker device housing 2 may be supported by the support 6 and the support 7, respectively, the mechanical coupling 5 may be configured such that only a small part of the weight of the speaker device housing 3 or the speaker enclosure structure 2 is supported via the mechanical coupling 5. In other words, the speaker enclosure structure 2 and the speaker device housing 3 are coupled by a soft suspension or the like.

In addition, the mechanical coupling 5 between the speaker enclosure structure 2 and the speaker device housing 3 may be formed by at least one coupling element 5, which has a vibration damping structure configured to inhibit mechanical vibrations being transmitted through the coupling element 5. Thereby, transmission of mechanical vibrations applied to the speaker device housing 3 to the speaker enclosure structure 2 can be inhibited or suppressed and transmission of mechanical vibrations applied to the speaker enclosure structure 2 to the speaker device housing 3 can be inhibited or suppressed. In particular, transmission of mechanical vibrations generated by the operation of the speaker 4 and applied to the speaker enclosure structure 2 to the speaker device housing 3 can be inhibited or supressed.

For example, the coupling element 5 is formed of rubber, metal, a rubber-metal compound or plastic. The coupling element 5 may also be formed to have a foam structure. For example, the coupling element is formed of polystyrene foam or polyurethane foam. Furthermore, the coupling element 5 may be formed integrally with the speaker enclosure structure 2, the speaker device housing 3 or either of them.

Although some of FIGS. 1A-F shows one single coupling element 5, the speaker enclosure structure 2 and the speaker device housing 3 may be mechanically coupled by a different number of coupling elements 5, e.g. as shown in FIG. 1A.

Furthermore, the supports 6 and 7 and/or the coupling element 5 also allows to compensate for e.g. an uneven surface where the speaker device is placed, e.g., a table surface, and/or tolerance in the production of the speaker enclosure structure 2 and speaker device housing 3.

Figure 2:
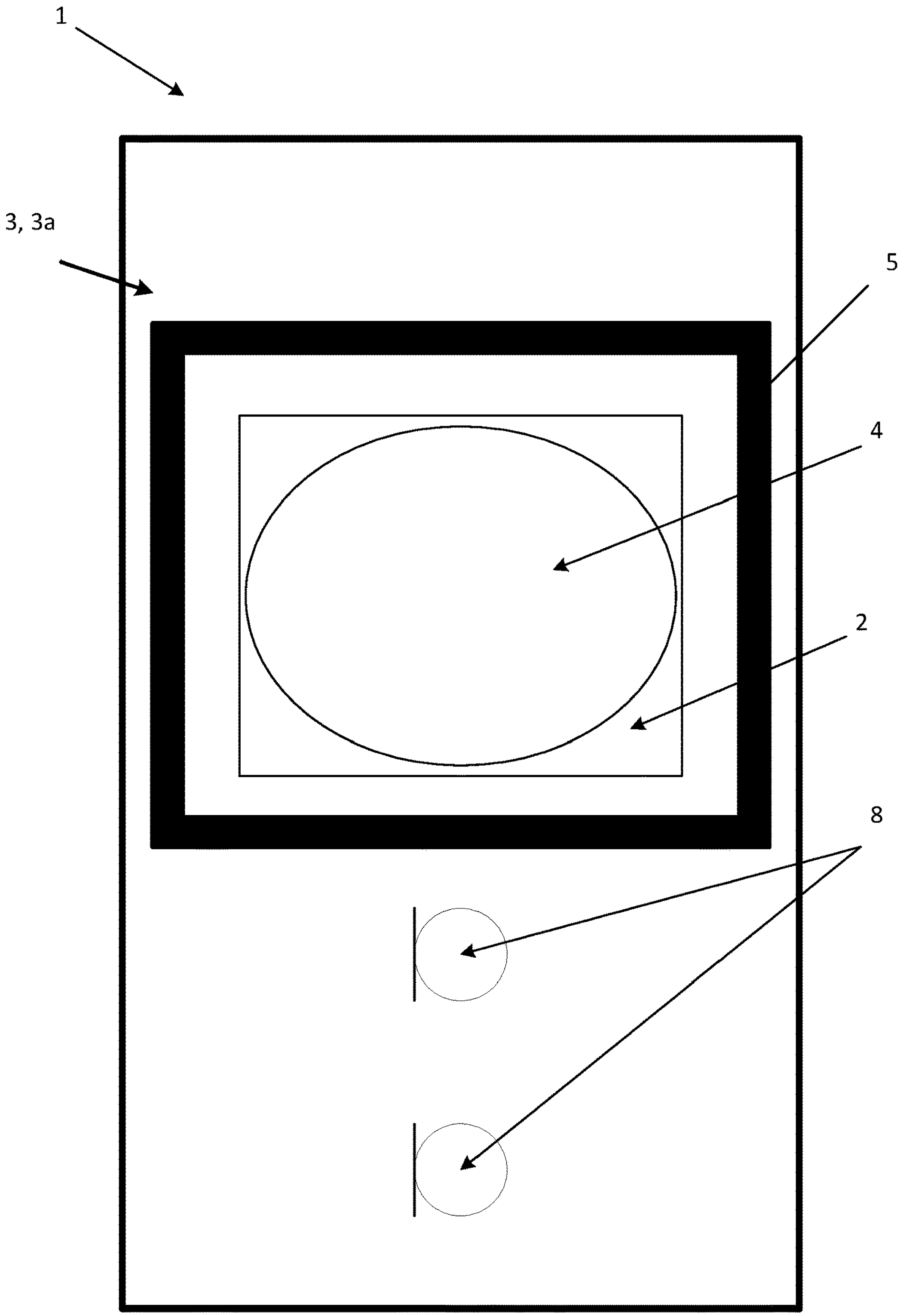
FIG. 2 is a plan view of a speaker device according to an embodiment of the disclosure.

FIG. 2 illustrates a speaker device 1 shown in FIGS. 1A-F in a plan view of the speaker device. In this embodiment, the speaker device 1 includes a speaker device housing 3, 3*a* which surrounds a speaker enclosure structure 2. Similar to the above embodiments, microphones 8 can be accommodated in the speaker device housing 3, 3*a*. Although not shown in FIG. 2, other electrical components may be accommodated in the speaker device housing 3, 3*a*.

A speaker 4 is provided at the speaker enclosure 2. The speaker 4 may be attached to a wall of the speaker enclosure structure 2 or may be arranged within the internal space of the speaker enclosure structure 2 and connected to the speaker enclosure structure 2. The speaker 4 may be connected to the speaker enclosure structure 2 by means of additional mounting devices, if required. The speaker 4 and the speaker enclosure 2 are arranged such that sound waves can be generated by collaboration of the speaker 4 and the speaker enclosure 2. Although not shown, additional electronic components required for operation of the speaker 4 or used for other functions of the speaker device 1 may be provided in or at the speaker enclosure structure 4.

As shown in FIG. 2, the speaker enclosure structure 2 and the speaker device housing 3, 3*a* are mechanically coupled by a coupling element 5. In this embodiment, the coupling element 5 is formed so as to surround the speaker enclosure structure 2. In other words, the coupling element 5 in this embodiment is formed as an enclosing suspension. For example, the coupling element 5 is formed as a thin, plate-shaped structure having a cut-out corresponding to the outline of the speaker enclosure 2. Although the coupling element 5 is shown in FIG. 2 as being formed in a rectangular ring around the speaker enclosure 2, the coupling element may have an annular shape or the like, depending on the outline of the speaker enclosure 2, which is not limited to a rectangle. Although only one coupling element is shown in FIG. 2, the speaker enclosure structure 2 and the speaker device housing may be mechanically coupled by a plurality of coupling elements 5 formed as an enclosing suspension, which are stacked in a view direction of FIG. 2.

Although the coupling element 5 is shown in FIG. 2 as being formed such as to completely surround the speaker enclosure structure without interruptions, the coupling element 5 may be formed with interruptions. In other words, a plurality of coupling elements 5, which at least partially surround the speaker enclosure structure 2, may be formed in order to mechanically couple the speaker enclosure structure 2 and the speaker device housing 3. These coupling elements 5 may be arranged at different sides with respect to the speaker enclosure structure 2.

As used, the singular forms "a," "an," and "the" are intended to include the plural forms as well (i.e. to have the meaning "at least one"), unless expressly stated otherwise. It will be further understood that the terms "includes", "comprises", "including" and/or "comprising", when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

The invention claimed is:

1. A speaker device comprising:

a housing comprising first and second parts, a speaker enclosure structure in which is arranged a speaker, the speaker enclosure structure being mechanically coupled to the second part in such manner that the speaker enclosure structure is detachably received into a cavity formed in the first part in coordination with positioning of the second part to be supported by the first part; and the speaker enclosure structure is mechanically coupled to the second part by means of at least one coupling element having a vibration damping structure configured to inhibit mechanical vibrations being transmitted through the at least one coupling element.

2. The speaker device according to claim 1, wherein at least one damping element provided at the housing supports the housing, the at least one damping element being flexible and configured to dampen mechanical vibrations.

3. The speaker device according to claim 1, wherein a support is provided at the speaker enclosure structure and capable of individually and at least partly supporting the speaker enclosure structure extraneously to the housing.

4. The speaker device according to claim 3, wherein the support assigned to the speaker enclosure structure is formed by at least one damping element provided at the speaker enclosure structure, the at last one damping element being flexible and configured to dampen mechanical vibrations.

5. The speaker device according to claim 1, wherein the first part of the housing accommodates the speaker enclosure, the speaker enclosure being mechanically coupled to the first part of the housing by the at least one coupling element.

6. The video bar according to claim 5, wherein at least one damping element provided at the second part of the housing, the at least one damping element being flexible and configured to dampen mechanical vibrations.

7. The speaker device according to claim 5, wherein at least one damping element is provided at the first part of the speakerphone housing, the at least one damping element being flexible and configured to dampen mechanical vibrations.

8. The speaker device according to claim 1, wherein the at least one coupling element is formed integrally with at least one of the speaker enclosure structure and the housing.

9. The speaker device according to claim 1, wherein the speaker enclosure structure is mechanically coupled to the speakerphone housing by a plurality of coupling elements, and wherein the plurality of coupling elements are arranged at different sides with respect to the speaker enclosure structure.

10. The speaker device according to claim 1, wherein the at least one coupling element is formed as an enclosing suspension around the speaker enclosure structure.

11. The speaker device according to claim 1, wherein the first part is arranged on top of the second part.

12. The speaker device according to claim 1, wherein the housing surrounds the speaker enclosure structure.

13. The speaker device according to claim 1, wherein the at least one battery and the one or more other electronic components are mounted to the speakerphone housing and separated from the speaker enclosure structure.

14. The speaker device according to claim 13, wherein an enclosing suspension is formed around at least one of the at least one battery and the other electronic components, the enclosing suspension being configured to dampen mechanical vibrations.

15. The speaker device according to claim 1, wherein the at least one coupling element is formed of at least one of: rubber, metal, a rubber-metal compound, plastic, polystyrene foam, polyurethane foam, and soft foam.

16. A video bar having a speakerphone, wherein the speaker device comprises:

a housing comprising first and second parts, a speaker enclosure structure in which is arranged a speaker, the speaker enclosure structure being mechanically coupled to the second part in such manner that the speaker enclosure structure is detachably received into a cavity formed in the first part in coordination with positioning of the second part to be supported by the first part; and the speaker enclosure structure is mechanically coupled to the second part by means of at least one coupling element having a vibration damping structure configured to inhibit mechanical vibrations being transmitted through the at least one coupling element.

17. The video bar according to claim 16, wherein the video bar is wall-mountable.

* * * * *